United States Patent
Smith et al.

(10) Patent No.: US 11,974,522 B2
(45) Date of Patent: May 7, 2024

(54) METHOD AND CONTROL SYSTEM FOR CONTROLLING BALER POWER-TAKE-OFF SPEED

(71) Applicant: CNH Industrial America LLC, New Holland, PA (US)

(72) Inventors: Kevin M. Smith, Narvon, PA (US); John R. McClure, New Holland, PA (US)

(73) Assignee: CNH Industrial America LLC, New Holland, PA (US)

(*) Notice: Subject to any disclaimer, the term of this patent is extended or adjusted under 35 U.S.C. 154(b) by 716 days.

(21) Appl. No.: 17/131,865

(22) Filed: Dec. 23, 2020

(65) Prior Publication Data
US 2022/0192098 A1 Jun. 23, 2022

(51) Int. Cl.
*A01F 15/08* (2006.01)
*A01F 15/07* (2006.01)

(52) U.S. Cl.
CPC ........ *A01F 15/085* (2013.01); *A01F 15/0715* (2013.01); *A01F 15/0883* (2013.01); *A01F 2015/076* (2013.01); *A01F 2015/0808* (2013.01); *A01F 2015/0891* (2013.01)

(58) Field of Classification Search
CPC .. A01F 15/07; A01F 15/0825; A01F 15/0833; A01F 15/0841; A01F 15/085; A01F 2015/077; A01F 2015/0808
See application file for complete search history.

(56) References Cited

U.S. PATENT DOCUMENTS

| | | | |
|---|---|---|---|
| 2,576,784 A | 11/1951 | Dodds et al. |
| 3,022,622 A | 2/1962 | Nolt |
| 3,525,302 A | 8/1970 | Eberly et al. |
| 3,901,007 A | 8/1975 | Blanshine et al. |
| 4,132,164 A | 1/1979 | White |
| 4,611,535 A | 9/1986 | Anstey et al. |
| 5,622,104 A | 4/1997 | Viesselmann et al. |
| 5,768,872 A | 6/1998 | Von Allworden |
| 6,079,324 A | 6/2000 | Feraboli et al. |

(Continued)

FOREIGN PATENT DOCUMENTS

| | | |
|---|---|---|
| DE | 10 2005 029 405 | 1/2007 |
| EP | 0 150 631 | 7/1985 |
| EP | 2777384 A1 | 9/2014 |

OTHER PUBLICATIONS

Extended European Search Report for EP Application 21215146.8 dated May 4, 2022 (five pages).

*Primary Examiner* — Matthew Katcoff
(74) *Attorney, Agent, or Firm* — Peter K. Zacharias; Rebecca L. Henkel; Rickard K. DeMille

(57) ABSTRACT

A method for forming a bale of crop material in an agricultural baler. The method includes rotating a baler power-take-off (PTO) shaft at a rotational speed, rotating a bale of crop material in a bale chamber, and sensing, by at least one sensor, at least one bale ejection condition. The at least one sensor is configured to provide at least one bale ejection condition value corresponding to the at least one sensed bale ejection condition. The method further includes receiving, by a controller, the at least one bale ejection condition value, and adjusting, by the controller, the rotational speed of the baler PTO shaft responsive to the at least one bale ejection condition value.

18 Claims, 3 Drawing Sheets

(56) References Cited

U.S. PATENT DOCUMENTS

| | | | |
|---|---|---|---|
| 6,272,825 B1 | 8/2001 | Anderson et al. | |
| 6,530,311 B1 | 3/2003 | Wilkens et al. | |
| 6,546,705 B2 | 4/2003 | Scarlett et al. | |
| 6,651,416 B2 | 11/2003 | Trelstad et al. | |
| 6,874,304 B2 | 4/2005 | Clauss | |
| 6,915,736 B2 | 7/2005 | Leupe et al. | |
| 6,975,911 B2 | 12/2005 | Stamps et al. | |
| 7,085,625 B2 | 8/2006 | Stamps et al. | |
| 7,104,191 B1 | 9/2006 | Parker et al. | |
| 7,340,996 B1 | 3/2008 | Viaud | |
| 7,681,382 B2 | 3/2010 | Viaud | |
| 7,703,391 B2 | 4/2010 | Duenwald et al. | |
| 8,311,709 B2 * | 11/2012 | Vanhercke | A01F 15/085 180/53.6 |
| 8,527,156 B2 * | 9/2013 | Martin | A01F 15/08 701/1 |
| 10,098,282 B2 | 10/2018 | Olander et al. | |
| 2002/0011061 A1 | 1/2002 | Lucand et al. | |
| 2004/0002368 A1 | 1/2004 | Shinners et al. | |
| 2004/0083704 A1 | 5/2004 | Lucand et al. | |
| 2008/0148703 A1 | 6/2008 | Smith et al. | |
| 2011/0023441 A1 | 2/2011 | Herron et al. | |
| 2011/0060507 A1 | 3/2011 | Vanhercke et al. | |
| 2012/0310491 A1 | 12/2012 | Vermeulen | |
| 2014/0013970 A1 | 1/2014 | Olander | |
| 2014/0261023 A1 | 9/2014 | Smith et al. | |
| 2014/0345481 A1 | 11/2014 | Olander et al. | |
| 2014/0373737 A1 | 12/2014 | Olander et al. | |

* cited by examiner

METHOD AND CONTROL SYSTEM FOR CONTROLLING BALER POWER-TAKE-OFF SPEED

BACKGROUND OF THE INVENTION

The invention pertains to agricultural balers, and more particularly, to the automatic control of bale formation based on sensed parameters.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. After the crop material has sufficiently dried, a baler which is typically towed by an agricultural vehicle will pick up the crop material and form it into bales.

A round baler may generally include a frame, supported by wheels, a pickup unit to engage and lift the crop material into the baler, a cutting unit, a main bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting unit. As the crop material enters the main bale chamber, multiple carrier elements, e.g. rollers, chains and slats, and/or belts, will begin to form a bale of hay within the chamber. These carrier elements are movable so that the chamber can initially contract and subsequently expand to maintain an appropriate amount of pressure on the periphery of the bale. After the bale is formed and wrapped by the wrapping mechanism, the bale is ejected out of the rear of the baler. In the case of large round balers, the rear of the baler is configured as a tailgate which opens for allowing the bale to be discharged onto the field.

Conventional balers generally do not actively adjust the power input into the baler via adjusting the rotational speed of the power-take-off (PTO) shaft. Hence, conventional balers receive a fixed power input from the PTO shaft of the towing vehicle. Some modern balers automatically adjust the bale density during operation of the baler. For example, U.S. Patent Pub. No. 2014/0261023 teaches actively adjusting bale density pressure in response to real-time operating conditions. The control system of the baler may sense the bale size and adjust the bale density pressure by adjusting the power input to the driving mechanism of the bale chamber. However, such systems do not account for optimizing power consumption during the bale forming cycle and the bale ejection cycle. Furthermore, the fixed PTO speed may cause inefficiencies if the power given to the baler is not presently needed by the baler. For instance, in round baler applications, the inputted power is typically set by the capacity of the baler; however, the baling speed is often limited by ground conditions instead of the capacity of the baler. In these instances, it may be desirable to operate the baler at a reduced PTO speed to minimize crop damage, reduce baler wear, and conserve fuel.

What is needed in the art is a cost-effective baler that optimizes energy consumption.

SUMMARY OF THE INVENTION

In one exemplary embodiment formed in accordance with the invention, there is provided a method and controller of a baler for forming a bale of crop material. The method includes rotating a baler power-take-off (PTO) shaft at a rotational speed, rotating a bale of crop material in a bale chamber, and sensing, by way of at least one sensor, at least one bale ejection condition. The method further includes receiving, by a controller, the at least one bale ejection condition value from the at least one sensor, and adjusting, by the controller, the rotational speed of the baler PTO shaft responsive to the at least one bale ejection condition value.

In another exemplary embodiment formed in accordance with the invention, there is provided a method for forming a bale of crop material in an agricultural baler. The method includes rotating a bale of crop material in a bale chamber, rotating a baler PTO shaft at a rotational speed, and sensing, by at least one sensor, at least one bale ejection condition. The at least one sensor is configured to provide at least one bale ejection condition value corresponding to the at least one sensed bale ejection condition. The method further includes receiving, by a controller, the at least one bale ejection condition value, and adjusting, by the controller, the rotational speed of the baler PTO shaft responsive to the at least one bale ejection condition value.

In another exemplary embodiment formed in accordance with the invention, there is provided a baler configured to form a bale of crop material. The baler includes a frame configured to be connected to an agricultural vehicle, a bale chamber connected to the frame, the bale chamber configured to form the bale of crop material therein, and a baler PTO shaft configured to be connected to and driven by the agricultural vehicle at a rotational speed. The baler PTO shaft is further configured to transmit power to the bale chamber. The baler further includes at least one sensor connected to the frame. The at least one sensor is configured to sense at least one bale ejection condition and provide at least one bale ejection condition value corresponding to the at least one sensed bale ejection condition, and a controller operably connected to the at least one sensor. The controller is configured to receive the at least one bale ejection condition value and adjust the rotational speed of the baler PTO shaft responsive to the at least one bale ejection condition value.

One possible advantage of the exemplary embodiment of the baler is the controller automatically and dually decreases PTO speed to reduce crop damage, baler damage, and fuel usage and increases PTO speed to augment bale density at the outer layers of a bale and accelerate bale wrapping time.

BRIEF DESCRIPTION OF THE DRAWINGS

For the purpose of illustration, there are shown in the drawings certain embodiments of the invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural assembly and/or components thereof are usually determined with reference to the direction of forward operative travel of the agricultural vehicle, but they should not be construed as limiting.

Figure 1:
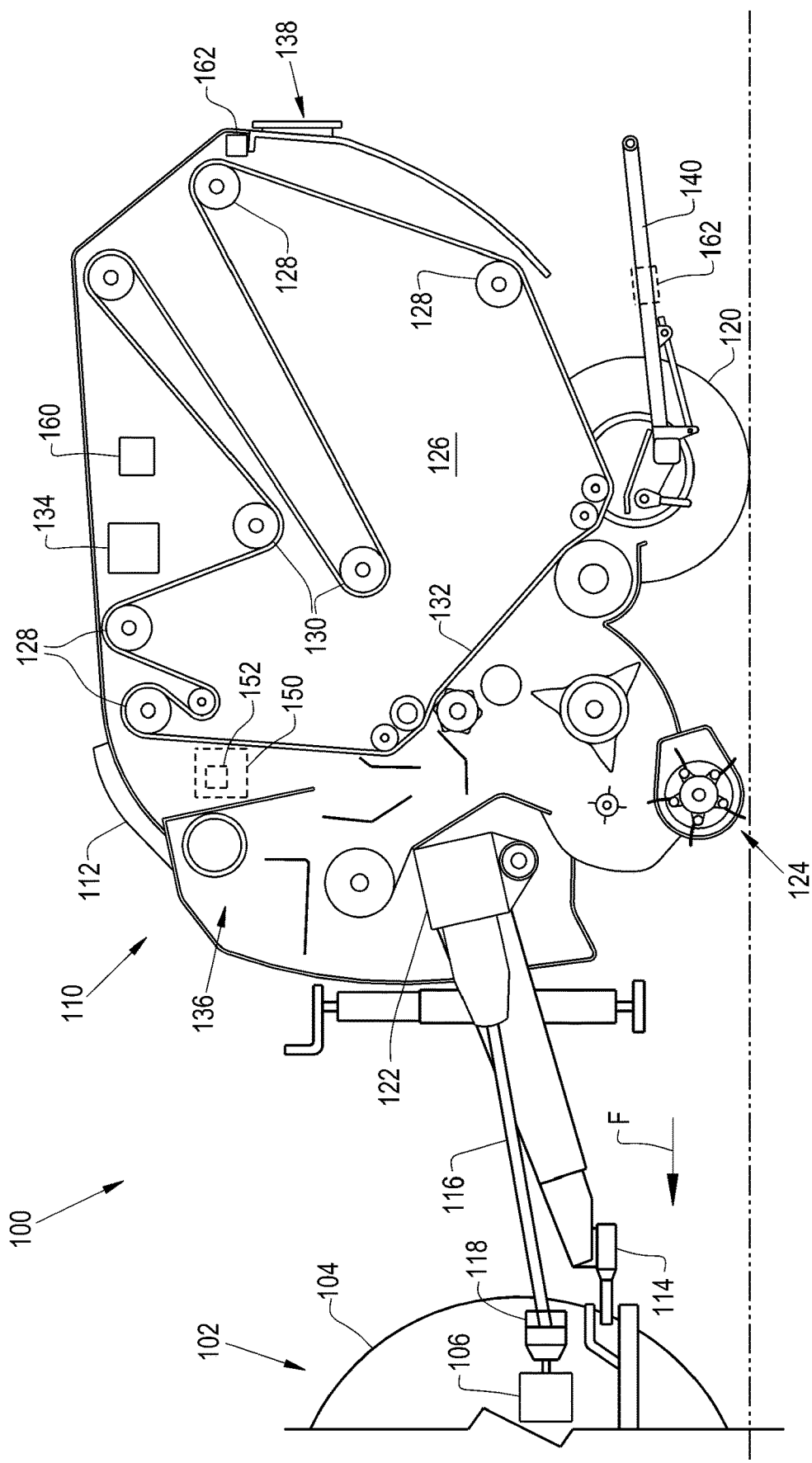
FIG. 1 illustrates a side view of an exemplary embodiment of an agricultural baling assembly, the assembly including an agricultural vehicle and a baler, in accordance with an exemplary embodiment of the invention.
Figure 2:
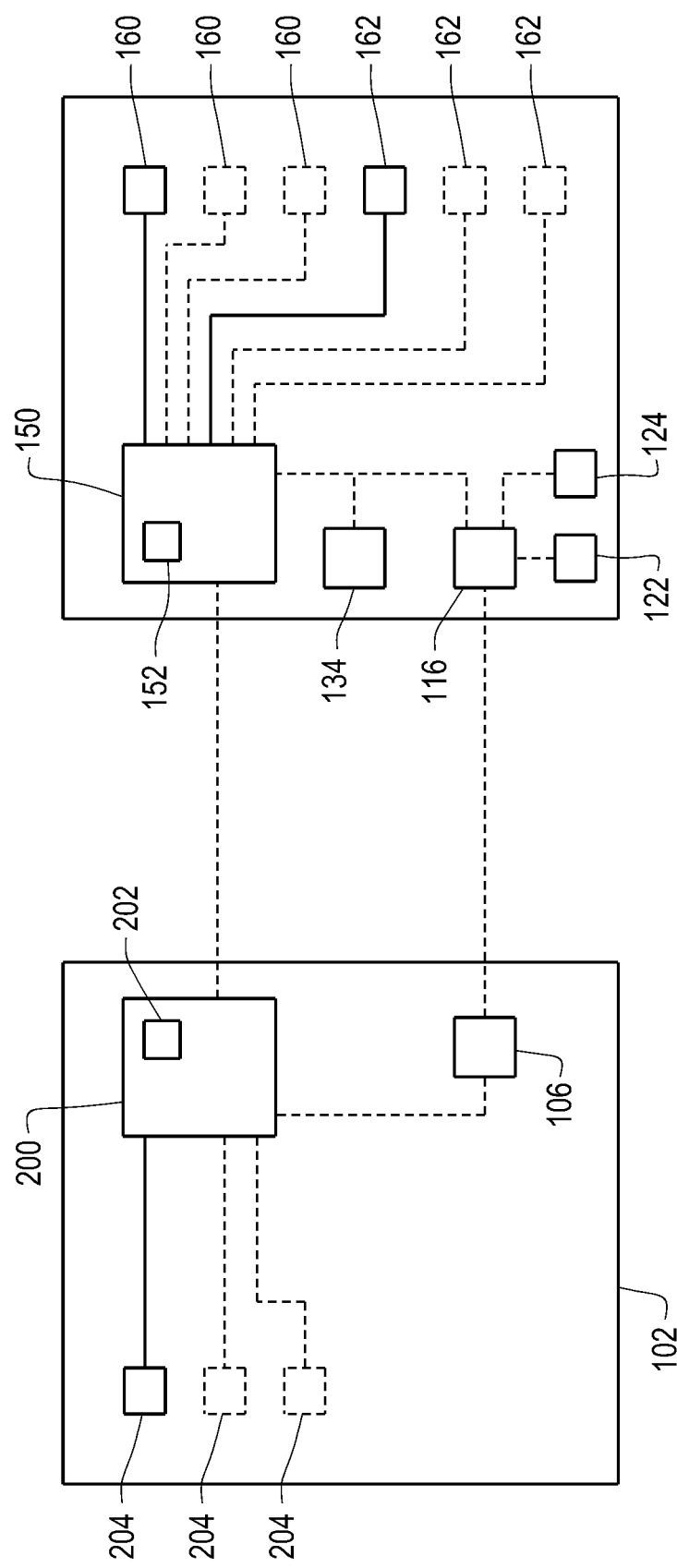
FIG. 2 illustrates a schematic view of the control system of the agricultural bailing assembly of FIG. 1.

Referring now to the drawings, and more particularly to FIGS. 1-2, there is shown an agricultural baling assembly 100. The agricultural baling assembly 100 generally includes an agricultural vehicle 102 and a baler 110 connected to and towed behind the agricultural vehicle 102 as the agricultural vehicle 102 travels in a forward direction of travel F.

The agricultural vehicle 102 generally includes a chassis, a prime mover, wheels and/or tracks 104, a tractor power-take-off (PTO) shaft 106, a controller 200 with a memory 202, and at least one operating condition sensor 204. The at least one operating condition sensor 204 may include any desired sensor such as a ground speed sensor, a global positioning system (GPS) location sensor, a vehicle PTO speed sensor, etc. In FIG. 2, the optional operating condition sensors 204 are shown in phantom. The agricultural vehicle 102 may be an autonomous or semi-autonomous vehicle. For instance, the agricultural vehicle 102 may be in the form a tractor 102.

The baler 110 generally includes a frame 112, a hitch 114 pivotally connected to the agricultural vehicle 102, a baler PTO shaft 116 with a PTO clutch 118 affixed thereto, and wheels 120. The baler PTO shaft 116 is connected to and driven by the PTO 106 of the agricultural vehicle 102. The baler PTO shaft 116 drives a driving mechanism 122 which in turn powers the various operational systems of the baler 110. The baler PTO shaft 116 and/or the PTO clutch 118 may have a mechanical stop, e.g. a pawl, which may stop the baler PTO shaft 116 from rotating. The baler 110 can also be connected to the agricultural vehicle 102 by way of an ISOBUS connection. As the baler 110 is towed by the agricultural vehicle 102, the baler 110 picks up crop material and forms a bale of crop material.

In operation, crop material is lifted from windrows into the baler 110 by a pickup unit 124. The crop material is moved rearwardly toward a bale chamber 126 which is connected to the frame 112. The bale chamber 126 may be in the form of a continuously variable bale chamber 126. Within the bale chamber 126, the crop material is rolled into a bale of a predetermined size.

The bale chamber 126 includes multiple rolls or rollers 128, 130, such as various stationary rollers 128 and movable rollers 130, one or more cylinders and/or pivot arms coupled to the movable rollers 130, at least one belt 132, and a bale density pressure mechanism 134 for controlling an amount of pressure which is applied onto the bale via the belt(s) 132. Together, the rollers 128, 130 and the belt(s) 132 create a round circulating chamber which expands in between an empty bale position and a full bale position for engaging and rolling the bale. As the bale grows inside the chamber 126 it begins to act upon the belt(s) 132 such that the belt(s) 132 pull against the pivot arms which in turn causes the movable rollers 130 to move upwardly so that the variable bale chamber 126 incrementally expands with the size of the bale.

It should be appreciated that the rollers 128, 130 may comprise a floor roller, starter roller, fixed roller(s), pivot roller(s), stripper roller, and/or follower roller(s). It should also be appreciated that the bale density pressure mechanism 134 may include one or more hydraulic cylinders and tensioning devices, such as coil springs, which are operably coupled to one or more of the rollers 128, 130 and/or the belt(s) 132 for adjusting density pressure applied to the bale. It is noted that the bale density pressure mechanism 134 is shown schematically.

When the bale reaches a predetermined size, the bale is wrapped with a wrapping material (e.g., mesh or twine) by a wrapping mechanism or wrapper 136. Thereafter, a tailgate 138 opens which allows the wrapped bale to be discharged out of the bale chamber 126 and onto a bale ejector, such as a kicker or ramp 140. The ramp 140 may move the bale rearwardly and deposit the bale onto the field or onto a bale holding device, thus providing sufficient clearance for the tailgate 138 to close unencumbered by the bale.

The baler 110 further includes a controller 150, with a memory 152, one or more operating condition sensors 160, and one or more bale ejection condition sensors 162. The controller 150 may be operably connected to the sensors 160, 162 and the various operational systems of the baler 110. The controller 150 may be connected to the vehicle controller 200 by a communication device, e.g. an ISOBUS, to provide communication between the agricultural vehicle 102 and the baler 110 to control the PTO speed, travel speed, pick up speed, and bale chamber speed. In some aspects, the communication device may provide communication between the agricultural vehicle 102 and baler 110 to automatically control the PTO speed while maintaining a certain ground speed of the baler. The controller 150 may comprise a main controller and one or more sub-controllers.

The controller 150 may be configured to receive at least one operating condition value corresponding to the at least one sensed operating condition and/or receive at least one bale ejection value corresponding to the at least one sensed bale ejection condition. The controller 150 may also be configured to control the formation of the bale by adjusting the rotational speed of the PTO shaft 116 in response to receiving the at least one operating condition value and/or at least one bale ejection value. Therein, the controller 150 may adjust the PTO speed based on one or more parameters including, but not limited to, the actual feed rate, baler capacity, minimum PTO speed, maximum PTO speed, PTO torque, ground speed, bale size, bale position during the ejection process, tailgate position, and/or ramp position. For example, the controller 150 may increase and/or decrease the PTO speed based on the position of the tailgate 138 and/or the torque on the PTO shaft 116. For instance, the controller 150 may increase the PTO speed to a maximum setting if the sensed bale size is greater than a preset threshold bale size and/or if the PTO torque is near a PTO clutch setting. The controller 150 can also increase the PTO speed based on a position of the tailgate 138, e.g. closed position, a raised position of the ramp 140, a position of the bale, and/or a ground speed, e.g. upon resuming forward travel. The controller 150 may control the baler PTO shaft 116 by requesting a power input, e.g. a speed of the vehicle PTO 106, and/or by controlling the baler PTO clutch 118. The controller 150 may be configured to receive the at least one bale ejection value and the at least one operating condition value upon request, at predetermined periodic intervals or when the condition value has a value change that is equal to or greater than a predetermined threshold value. The controller 150 may be further configured to determine the capacity of the baler 110 and a clutch torque setting. For instance, the controller 150 may receive operator inputted information, automatically search in lookup table(s), and/or directly measure the requisite information via one or more sensors on the baler 110.

In some exemplary embodiments, the controller 150 may be configured to automatically determine the bale size as the bale is being formed in the bale chamber 126, the amount of bale density pressure applied to the bale, the torque on the PTO shaft 116 and/or clutch 118, and/or the speed of the PTO shaft 116. In some embodiments, the controller 150 may be configured to automatically determine both the bale density pressure and the PTO speed, and accordingly adjust the bale density pressure and PTO speed by controlling the bale density pressure mechanism 134 and the baler PTO shaft 116. The bale chamber speed of the bale chamber 126 may be fixed relative to the PTO speed of the baler PTO shaft 116.

The operating condition sensor(s) 160 may sense at least one operating condition and accordingly provide an operating condition value, e.g. signal, to the controller 150. Each sensor 160 may be located on or proximate to a respective component to sense a bale size, a bale weight, a rate of change of bale size, a rate of change of bale weight, a bale moisture content, a rate of incoming crop flow, an amount of PTO torque, an amount of a PTO clutch torque, a setting or rating of the PTO clutch, a rate of fuel consumption, a density of the bale, and/or a ground speed. Each operating condition sensor 160 may be in the form of any desired sensor.

The bale ejection sensor(s) 162 may sense at least one bale ejection condition and accordingly provide a bale ejection condition value, e.g. signal, to the controller 150. Each bale ejection sensor 162 may be located on or proximate to a component to sense a tailgate position, a ramp position, a bale position, e.g. whether the bale is in the bale chamber 126, on the ramp 140, or on the field, an inclinometer reading of a portion of the baler, a ground speed, and/or a status of the wrapper 136. For example, baler 110 may include a single bale ejection sensor 162 in the form of a tailgate position sensor 162 for sensing an open or closed position of the tailgate 138. Additionally, for example, the baler 110 may include multiple bale ejection sensors 162, such as a tailgate position sensor 162 and a bale location sensor 162. The bale location sensor 162 may be in the form of an optical sensor which can be located in the bale chamber 126, on an interior or exterior frame member, or on the bale ramp 140. The bale location sensor 162 may also be in the form of a pressure sensor which is located on the bale ramp 140 or a suspension member(s), e.g. the leaf springs. The bale location sensor 162 may further be in the form of a baler inclinometer for sensing an angle of a portion of the baler 110. For instance, the baler inclinometer 162 may be connected to the tailgate 138, or a frame member or actuator thereof, for sensing a position of the tailgate 138 relative to the frame 112. It should be appreciated that the bale ejection sensor(s) 162 may be any desired sensor for sensing one or more parameters relating to the starting and/or stopping of the bale ejection cycle.

As can be appreciated, the components of balers may operate at different speeds, affecting the formation of the bales in the bale chamber. These speeds may include PTO speed, bale chamber speed, pick up speed and travel or ground speed. PTO speed is the speed of the PTO shaft 116 that draws energy from a tractor to drive mechanisms in the baler 10. Part of the PTO drive train is coupled to the bale chamber 126 by way of the driving mechanism 122. Another part of the PTO drive train is coupled to the pickup unit 124. The bale chamber speed is the rotational speed of the bale turning in the baler 110. The pickup speed is the speed of the pickup unit 124, e.g., speed of a rotor feeder or stuffer controlling the rate of crop flowing into the bale chamber 126. The travel speed is the ground speed of the tractor and baler combination. The adjustment of the speed of the pickup unit 124 may impact the rate at which the density of the bale forms in the bale chamber 126. Furthermore, the adjustment of the various parameters of the bale chamber 126, e.g. the pressure applied by the bale density pressure mechanism 134, may also impact the density of the bale. The number of rotations needed to form a bale of a desired density may be controlled by PTO speed and bale density pressure. Operating conditions that may change during the formation of the bale, however, may affect the number of rotations needed to form a bale of a desired density. These operating conditions may include, but are not limited to, bale size, bale weight, rate of change of bale size, rate of change of bale weight, bale moisture content, rate of incoming crop flow, amount of PTO torque, a torque setting or rating of the PTO clutch, and rate of fuel consumption.

Figure 3:
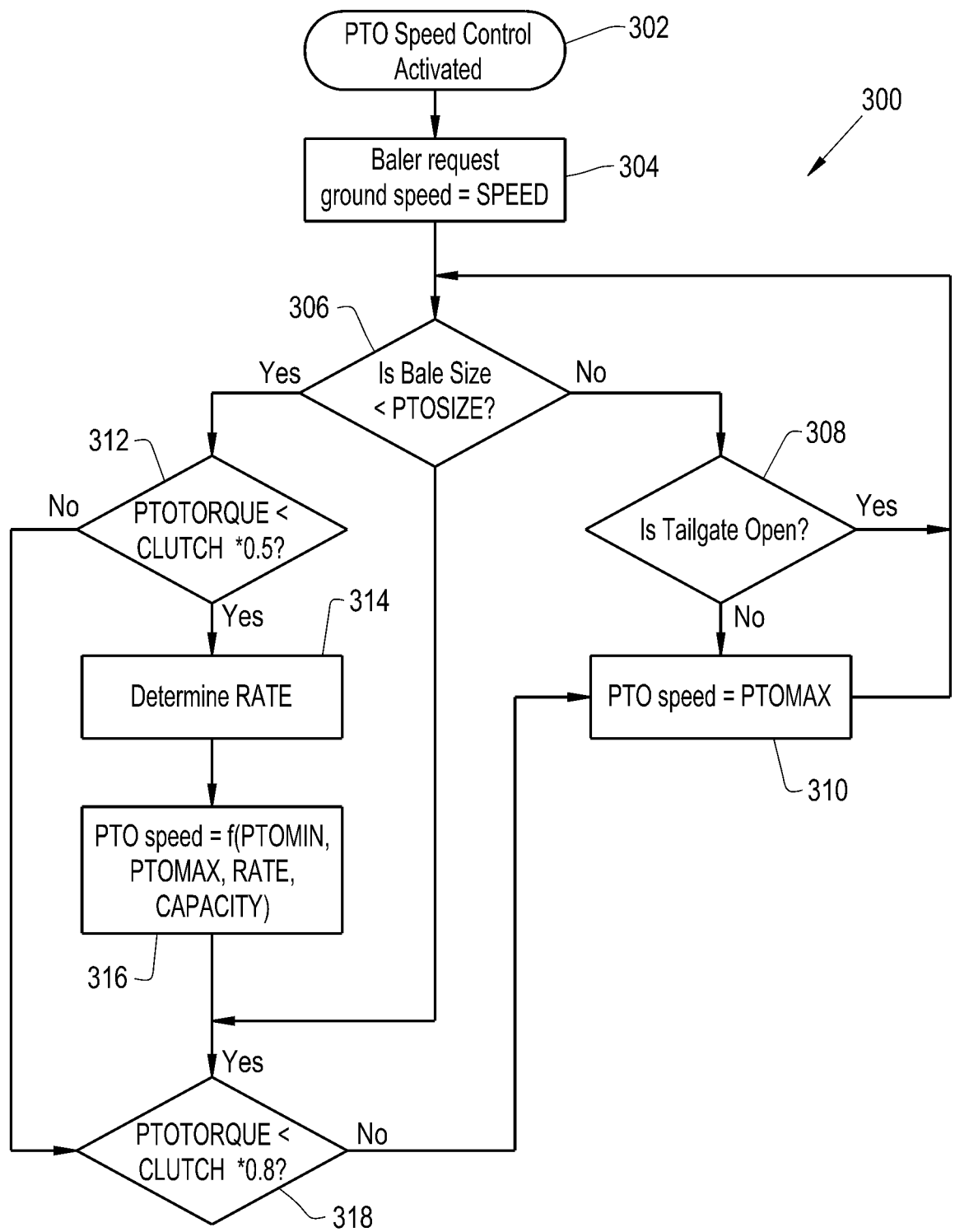
FIG. 3 illustrates a flowchart of a method for forming a bale of crop material, in accordance with an exemplary embodiment of the invention.

Referring now to FIG. 3, there is shown a flow chart of a method 300 for forming a bale of crop material. The method 300 may include initial steps of operating the baler 110, for example, providing power to the baler 110, rotating the PTO shaft 116, rotating the bale chamber 126, sensing various conditions with the sensors 160, 162, receiving the sensed condition values, etc. Additionally, the controller 150 and/or the operator may set initial parameters, including a maximum PTO speed, a minimum PTO speed, and a desired threshold bale size at which the rotational speed of the PTO shaft 116 should increase, e.g. to the maximum PTO speed. The preset threshold bale size may be a bale size at which the operator wishes to increase bale density in order to finish the bale with a greater density at its outer layer(s). After the initial steps, or concurrently therewith, the method 300 may also include activating the PTO speed control (at block 302). The controller 150 and/or operator may set a desired ground speed (at block 304). For example, the controller 150 may request a desired ground speed from the controller 200 of the agricultural vehicle 102. During operation, the controller 150 may then compare the bale size with the preset threshold (at block 306). If the present bale size is greater than the threshold bale size, then the controller 150 may determine whether the tailgate 138 is opened or closed (at block 308). If the tailgate 138 is closed, then the formation cycle is not yet complete, and the controller 150 may increase the rotational speed of the PTO shaft 116 to increase outer layer density and/or expedite the wrapping process of the wrapper 136 (at block 310). If the tailgate 138 is open, then ejection cycle may have begun and further the bale may no longer be inside of the bale chamber 126, and the controller 150 may maintain or decrease the PTO speed until the next bale formation cycle. If the present bale size is less than the threshold bale size, then the controller may compare the sensed PTO torque with the PTO clutch setting from the baler 110 (at block 312). If the sensed PTO torque is greater than a desired percentage of the PTO clutch setting, for example approximately half, then the controller 150 may increase the PTO speed (at block 310). If the sensed PTO torque is less than the desired percentage of the PTO clutch setting, the controller 150 may determine a real-time feed rate (at block 314). For instance, the feed rate may be based on the bale size growth rate taken over a set time period such as five seconds. Thereafter, the controller 150 may determine an optimal PTO speed based on the amount of torque of the baler PTO shaft (at block 316). After calculating the optimal PTO speed, the controller 150 may apply the optimal PTO speed to the baler PTO shaft 116. Thereafter, the controller may again compare the sensed PTO torque with the PTO clutch setting from the baler 110 (at block 318). If the sensed PTO torque is less than a desired percentage of the PTO clutch setting, such as less than 0.8 percent of the PTO clutch setting, then the controller 150 may revert back to comparing the bale size to the threshold bale size (at block 306). If not, then the controller 150 may increase the PTO speed (at block 310).

The controller 150 may determine the optimal PTO speed as a function of the maximum PTO speed, the minimum PTO speed, feed rate, and the capacity of the baler 110. The function may comprise:

$$PTO_{OPT} = PTO_{MAX} - (PTO_{MAX} - PTO_{MIN}) * \left(1 - \frac{\text{CAPACITY}}{\text{FEED RATE}}\right).$$

wherein in the above equation, $PTO_{OPT}$ is the PTO optimal speed, $PTO_{MAX}$ is the maximum PTO speed, $PTO_{MIN}$ is the minimum PTO speed, CAPACITY is the bale capacity of the bale chamber 126, and the FEED RATE is the real-time feed rate of the bale chamber 126.

In another exemplary embodiment, the method may further include automatically adjusting PTO speed during bale ejection or tailgate closing. The controller 150 may increase the PTO speed to a maximum PTO speed if: (i) a sensed bale size is greater than or equal to the threshold bale size, or (ii) the PTO torque is approximately equal to the PTO clutch setting. Furthermore, the controller 150 may increase the PTO speed, or return to the optimal PTO speed, based on: tailgate position sensed by the tailgate position sensor 162 during a closing cycle, a closed position of the tailgate 138, location of the bale sensed by a location sensor 162, a position of the ramp 140 sensed by a ramp position sensor 162, and/or a forward travel speed, i.e., resuming PTO speed when resuming forward travel. The controller 150 may decrease PTO speed, including completely stopping the PTO shaft 116, based on: an open position of the tailgate 138, a completed status of the wrapper 136, a position of the tailgate 138 during an open cycle, a position of the ramp 140, a position of the bale, i.e., empty bale chamber 126, sensed by the bale location sensor 162, and/or an angle of a portion of the baler 110 relative to another portion sensed by the inclinometer 162.

In another exemplary embodiment, the method may further include automatically determining the amount of bale density pressure applied to the bale responsive to receiving the at least one received operating condition value and controlling formation of the bale by adjusting the amount of bale density pressure to be applied to the bale relative to the previously determined amount of bale density pressure being applied.

It is to be understood that the steps of the method 300 may be performed by the controller 150 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 150 described herein, such as the method 300, is implemented in software code or instructions which are tangibly stored on a tangible computer readable medium. The controller 150 loads the software code or instructions via a direct interface with the computer readable medium or via a wired and/or wireless network. Upon loading and executing such software code or instructions by the controller 150, the controller 150 may perform any of the functionality of the controller 150 described herein, including any steps of the method 300 described herein.

The term "software code" or "code" used herein may refer to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

The invention claimed is:

1. A method for forming a bale of crop material in an agricultural baler, comprising:
    rotating a baler power-take-off (PTO) shaft at an optimal rotational speed as a function of a rate of change of bale size, a maximum PTO speed, a minimum PTO speed, and/or a capacity of the baler;
    rotating a bale of crop material in a bale chamber;
    sensing, by at least one sensor, at least one bale ejection condition comprising at least one of a tailgate position, a ramp position, a bale position, an inclinometer reading of a portion of the baler, and a status of a wrapper, the at least one sensor being configured to provide at least one bale ejection condition value corresponding to the at least one sensed bale ejection condition;
    receiving, by a controller, the at least one bale ejection condition value; and
    adjusting, by the controller, a rotational speed of the baler PTO shaft responsive to the at least one bale ejection condition value from the optimal rotational speed to an adjusted rotational speed that approaches the maximum PTO shaft speed.

2. The method of claim 1, wherein adjusting the rotational speed of the baler PTO shaft further comprises subsequently decreasing the rotational speed if the at least one bale ejection condition indicates at least one of an open tailgate and an empty bale chamber.

3. The method of claim 1, further comprising sensing, by at least one additional sensor, at least one operating condition and receiving, by the controller, at least one operating condition value corresponding to the at least one sensed operating condition, wherein adjusting the rotational speed of the baler PTO shaft is responsive to the at least one bale ejection condition value and the at least one operating condition value.

4. The method of claim 3, wherein the at least one operating condition comprises at least one of a bale size, a bale weight, a rate of change of bale size, a rate of change of bale weight, a rate of incoming crop flow, a density of the bale, an amount of torque of the baler PTO shaft, a setting of a PTO clutch connected to the baler PTO shaft, and a ground speed.

5. The method of claim 4, wherein the at least one operating condition comprises the bale size, wherein adjusting the rotational speed of the baler PTO shaft comprises increasing the rotational speed of the baler PTO shaft if the bale size is greater than a bale size threshold value.

6. The method of claim 5, wherein adjusting the rotational speed of the baler PTO shaft further comprises subsequently decreasing the rotational speed of the baler PTO shaft.

7. The method of claim 4, wherein the at least one operating condition comprises the amount of torque of the baler PTO shaft, wherein the method further comprises determining, by the controller, the optimal rotational speed of the baler PTO shaft based on the amount of torque of the baler PTO shaft.

8. The method of claim 4, wherein the at least one operating condition comprises the rate of change of bale size, wherein the method further comprises determining, by the controller, the optimal rotational speed of the baler PTO shaft based on the rate of change of bale size.

9. The method of claim 8, further comprising setting the maximum PTO speed and the minimum PTO speed.

10. The method of claim 1, wherein adjusting the rotational speed of the baler PTO shaft further comprises increasing the rotational speed based on at least one of a tailgate position, a ramp position, a bale position, and a ground speed.

11. A baler configured to form a bale of crop material, comprising:
a frame configured to be connected to an agricultural vehicle;
a bale chamber connected to the frame, the bale chamber configured to form the bale of crop material therein;
a baler power-take-off (PTO) shaft configured to be connected to and driven by the agricultural vehicle at a rotational speed, the baler PTO shaft being further configured to transmit power to the bale chamber;
at least one sensor connected to the frame, the at least one sensor (i) senses at least one bale ejection condition comprising at least one of a tailgate position, a ramp position, a bale position, an inclinometer reading of a portion of the baler, and a status of a wrapper, and (ii) provides at least one bale ejection condition value corresponding to the at least one sensed bale ejection condition; and
a controller operably connected to the at least one sensor, the controller:
rotates the baler power-take-off (PTO) shaft at an optimal rotational speed as a function of a rate of change of bale size, a maximum PTO speed, a minimum PTO speed, and/or a capacity of the baler;
receives the at least one bale ejection condition value; and
adjusts the rotational speed of the baler PTO shaft responsive to the at least one bale ejection condition value from the optimal rotational speed to an adjusted rotational speed that approaches the maximum PTO shaft speed.

12. The baler of claim 11, wherein the controller is configured to adjust the rotational speed of the baler PTO shaft by subsequently decreasing the rotational speed if the at least one bale ejection condition indicates at least one of an open tailgate and an empty bale chamber.

13. The baler of claim 11, further comprising at least one additional sensor connected to the frame and operably connected to the controller, the at least one additional sensor being configured to sense at least one operating condition, wherein the controller is further configured to receive at least one operating condition value corresponding to the at least one sensed operating condition, wherein the controller is configured to adjust the rotational speed of the baler PTO shaft responsive to the at least one bale ejection condition value and the at least one operating condition value.

14. The baler of claim 13, wherein the at least one operating condition comprises at least one of a bale size, a bale weight, a rate of change of bale size, a rate of change of bale weight, a rate of incoming crop flow, a density of the bale, an amount of torque of the baler PTO shaft, a setting of a PTO clutch connected to the baler PTO shaft, and a ground speed.

15. The baler of claim 14, wherein the at least one operating condition comprises the bale size, wherein the controller is configured to adjust the rotational speed of the baler PTO shaft by increasing the rotational speed of the baler PTO shaft if the bale size is greater than a bale size threshold value.

16. The baler of claim 15, wherein the controller is further configured subsequently decrease the rotational speed of the baler PTO shaft.

17. The baler of claim 14, wherein the at least one operating condition comprises the amount of torque of the baler PTO shaft, wherein the controller is further configured to determine the optimal rotational speed of the baler PTO shaft based on the amount of torque of the baler PTO shaft.

18. The baler of claim 14, wherein the at least one operating condition comprises the rate of change of bale size, wherein the controller is further configured to determine the optimal rotational speed of the baler PTO shaft based on the rate of change of bale size.

* * * * *